(12) United States Patent
Shi et al.

(10) Patent No.: US 11,318,459 B2
(45) Date of Patent: May 3, 2022

(54) METHOD AND APPARATUS FOR MICROORGANISM DETECTION

(71) Applicant: Becton, Dickinson and Company, Franklin Lakes, NJ (US)

(72) Inventors: Song Shi, Reisterstown, MD (US); Mei Yang, Baltimore, MD (US); Klaus W. Berndt, Cockeysville, MD (US); Robert J. Losada, Astoria, NY (US); Jamieson W. Crawford, Hagerten (SE); Ravi Attri, Budd Lake, NJ (US); Christopher A. Battles, Seymour, CT (US); Benjamin R. Bartfeld, Ringwood, NJ (US); Gregory R. Hires, Fairfield, CT (US)

(73) Assignee: Becton, Dickinson and Company, Franklin Lakes, NJ (US)

( * ) Notice: Subject to any disclaimer, the term of this patent is extended or adjusted under 35 U.S.C. 154(b) by 761 days.

(21) Appl. No.: 14/426,555

(22) PCT Filed: Sep. 4, 2013

(86) PCT No.: PCT/US2013/057953
§ 371 (c)(1),
(2) Date: Mar. 6, 2015

(87) PCT Pub. No.: WO2014/039498
PCT Pub. Date: Mar. 13, 2014

(65) Prior Publication Data
US 2015/0231626 A1 Aug. 20, 2015

Related U.S. Application Data

(60) Provisional application No. 61/711,323, filed on Oct. 9, 2012, provisional application No. 61/698,183, filed on Sep. 7, 2012.

(51) Int. Cl.
*B01L 3/00* (2006.01)
*G01N 1/40* (2006.01)

(52) U.S. Cl.
CPC .............. *B01L 3/50* (2013.01); *B01L 3/502* (2013.01); *B01L 3/5082* (2013.01);
(Continued)

(58) Field of Classification Search
CPC ........ B01L 2300/06; B01L 3/50; B01L 3/502; B01L 3/5082; B01L 3/50825;
(Continued)

(56) References Cited

U.S. PATENT DOCUMENTS 6,479,298 B1 11/2002 Miller et al.
6,803,022 B2 10/2004 DiCesare et al.
(Continued)

*Primary Examiner* — Lydia Edwards
(74) *Attorney, Agent, or Firm* — The Webb Law Firm

(57) ABSTRACT

A method for detecting the presence of a microorganism in a fluid sample is disclosed. The method includes providing a fluid specimen within a specimen collection container having a sidewall defining an interior therein. The interior includes a mechanical separator adapted for separating the fluid sample into first and second phases within the specimen collection container and a sensing element capable of detecting the presence of a microorganism disposed therein. The method includes subjecting the specimen collection container to applied rotational force to isolate a concentrated microorganism region. The method also includes detecting by a sensing element the presence or absence of a microorganism within the concentrated microorganism region.

24 Claims, 12 Drawing Sheets

(52) U.S. Cl.
CPC ....... *B01L 3/50215* (2013.01); *B01L 3/50825* (2013.01); *G01N 1/40* (2013.01); *B01L 2300/06* (2013.01); *B01L 2300/0636* (2013.01); *B01L 2300/0663* (2013.01)

(58) Field of Classification Search
CPC ..... B01L 2300/0636; B01L 2300/0663; B01L 3/50215; G01N 1/40
See application file for complete search history.

(56) References Cited

U.S. PATENT DOCUMENTS

| | | | |
|---|---|---|---|
| 7,329,534 B2 | 2/2008 | Haubet et al. | |
| 7,947,236 B2 | 5/2011 | Losada et al. | |
| 8,173,438 B1* | 5/2012 | Putnam | C12M 41/46 435/29 |
| 2005/0059105 A1* | 3/2005 | Alocilja | G01N 33/5438 435/7.32 |
| 2005/0059163 A1 | 3/2005 | Dastane et al. | |
| 2005/0186120 A1* | 8/2005 | Dorian | A61M 1/3693 422/400 |
| 2006/0034731 A1* | 2/2006 | Lewis | G01N 27/121 422/88 |
| 2006/0172279 A1* | 8/2006 | Smela | G01N 33/5044 435/4 |
| 2008/0262321 A1* | 10/2008 | Erad | B01L 3/5027 600/301 |
| 2010/0155319 A1 | 6/2010 | Felix et al. | |
| 2010/0288694 A1* | 11/2010 | Crawford | B01L 3/50215 210/521 |
| 2010/0317106 A1* | 12/2010 | Levine | G01N 33/491 435/372 |
| 2011/0207158 A1* | 8/2011 | Van Veen | C12Q 1/22 435/19 |

* cited by examiner

METHOD AND APPARATUS FOR MICROORGANISM DETECTION

CROSS-REFERENCE TO RELATED APPLICATIONS

This application is the United States national phase of International Application No. PCT/US2013/057953 filed Sep. 4, 2013, and claims priority to U.S. Patent Application No. 61/698,183 filed Sep. 7, 2012 and U.S. Patent Application No. 61/711,323 filed Oct. 9, 2012, the disclosures of which are hereby incorporated in their entirety by reference.

BACKGROUND OF THE INVENTION

Field of the Invention

The subject invention relates to a method and device for concentrating and detecting a microorganism in a fluid sample. More particularly, this invention relates to a method and device for concentrating microorganisms into a confined volume and detecting microorganism growth in the confined volume.

Description of Related Art

Sepsis is a significant healthcare issue and is characterized by a whole-body inflammatory state, identified as systemic inflammatory response syndrome, or SIRS, and the presence of a known or suspected infection. A patient may develop this immune system inflammatory reaction in response to microorganisms in the blood, urine, lungs, skin, or other tissues. One of the leading causes of sepsis is a bloodstream infection (BSI). BSI is most commonly diagnosed by blood culture in which a sample of blood is allowed to incubate with a medium in a controlled atmosphere that promotes bacterial growth.

In certain cases, it is believed that there are as few as one infectious microorganism present in one milliliter of infected blood sample at the time of sample collection from a patient. Current automated blood culture systems typically take between 12-24 hours to detect the presence of infectious microorganisms in a blood sample, and take up to five days to completely rule out the presence of infectious microorganisms. In current systems, it takes another 12-48 hours to identify the infectious microorganism by sub-culturing the positive blood culture and performing identification and antimicrobial susceptibility tests. The delay in the detection process may be detrimental to the treatment course of a patient, resulting in results arriving too late to alter a treatment course and the loss of lives.

Accordingly, it would be advantageous to shorten the time required to detect the presence of infectious microorganisms in a blood sample to less than 24 hours.

SUMMARY OF THE INVENTION

The present invention recognizes that it would be advantageous to concentrate the small number of infectious microorganisms present in an infected blood specimen at the time of collection. The present invention further recognizes that it would be advantageous to provide a concentrated fraction of the blood sample containing the microorganisms to a growth media for inoculation. Other fluid specimens, such as urine, sputum, saliva, cerebrospinal fluid, pleural fluid, and other bodily fluids may also be used in conjunction with the present invention. It is also noted that the present invention may be used for still other fluid specimens obtained from industrial, food, and cosmetic samples for microbiology cultures.

In accordance with an embodiment of the present invention, an apparatus for detecting the presence of a microorganism includes a specimen collection container having an open top end, a bottom end, and a sidewall extending therebetween defining an interior therein. Optionally, the tube may have a pierceable closure at both ends of the tube to permit specimen sampling from both ends of the tube. The apparatus also includes a closure engageable with the specimen collection container to seal the open top end. The apparatus further includes a mechanical separator disposed within the interior and adapted for separating a fluid sample into first and second phases within the specimen collection container. The mechanical separator includes at least one feature selected from the group consisting of at least two regions of differing densities and a density gradient. The apparatus further includes a sensing element capable of detecting the presence of a microorganism disposed within the interior of the specimen collection container. In one configuration, the sensing element is positioned within the space containing the second phase of the separated fluid sample.

The mechanical separator may be radially deformable between a first position in which the fluid sample can pass between an inner surface of the sidewall of the specimen collection container and the mechanical separator, and a second position in which at least a portion of the mechanical separator circumferentially contacts the inner surface of the sidewall preventing the fluid sample from passing between the inner surface of the sidewall of the container and the mechanical separator.

The mechanical separator may include a deformable bellows having an upper end and a lower end, and a sealing portion disposed therebetween providing sealing engagement with the sidewall of the specimen collection container. The mechanical separator may also include a float, having a first density, engaged with a portion of the bellows, and a ballast engaged with a portion of the bellows and having a second density, with the second density being greater than the first density.

Optionally, the mechanical separator may include a separator body having a through-hole defined therein, the through-hole adapted for allowing fluid to pass therethrough. The separator body may include a float, having a first density, and a ballast, having a second density greater than the first density, wherein a portion of the float is connected to a portion of the ballast. The mechanical separator may be releasably engaged with a portion of the closure and/or a portion of the sidewall of the specimen collection container. In another configuration, the mechanical separator may be engaged with a portion of the closure in a first initial position, and the mechanical separator may be engaged with a portion of the sidewall of the specimen collection container in a second sealing position.

In certain configurations, the fluid specimen is blood. The sensing element may include a sensor for detecting at least one of metabolic energy, carbon dioxide, pH, and volatile organic compounds. The sensing element may be an optical sensor. In one configuration, the second phase is denser than the first phase and the sensing element is provided in communication with the second phase.

In other configurations, a lysis reagent may be disposed within the interior of the specimen collection container. Optionally, a volume of fluid of the second phase is from about 1 µl to about 500 µl. In another configuration, a volume of fluid of the second phase is from about 5 µl to about 200 µl.

In accordance with another embodiment of the present invention, an apparatus for detecting the presence of a microorganism includes a specimen collection container including an open top end, a bottom end, and a sidewall extending therebetween having an inner surface and defining an interior therein, with the interior adapted to contain a fluid specimen therein. The apparatus further includes a closure engageable with the specimen collection container to seal the open top end. The apparatus also includes a mechanical separator disposed within the interior, wherein at least a portion of the mechanical separator is radially deformable between a first position in which fluid may pass between the inner surface of the specimen collection container and the mechanical separator, to a second position in which at least a portion of the mechanical separator contacts the inner surface of the sidewall to prevent fluid from passing between the inner surface of the specimen collection container and the mechanical separator. The mechanical separator is adapted to isolate a concentrated microorganism region from a remainder of the fluid specimen in response to applied rotational force.

In certain configurations, a volume of the concentrated microorganism region is from about 1 µl to about 500 µl. In still other configurations, a volume of the concentrated microorganism region is from about 5 µl to about 200 µl.

The apparatus may also include a sensing element capable of detecting the presence of a microorganism disposed within the concentrated microorganism region. The sensing element may include a sensor for detecting at least one of metabolic energy, carbon dioxide, pH, and volatile organic compounds.

The mechanical separator may include a deformable bellows having a radially deformable portion, a float engaged with a portion of the bellows and having a first density, and a ballast engaged with a portion of the bellows and having a second density, the second density being greater than the first density. Optionally, the mechanical separator may include a separator body having a through-hole defined therein, the through-hole adapted for allowing fluid to pass therethrough. The separator body may include a float, having a first density, and a ballast, having a second density greater than the first density, wherein a portion of the float is connected to a portion of the ballast. The mechanical separator may be releasably engaged with a portion of the closure and/or portion of the sidewall of the specimen collection container. The mechanical separator may be engaged with a portion of the closure in a first initial position, and the mechanical separator may be engaged with a portion of the sidewall of the specimen collection container in a second sealing position. Optionally, a lysis reagent may be disposed within the interior of the specimen collection container.

In accordance with yet another embodiment of the present invention, an apparatus for detecting the presence of a microorganism includes a specimen collection container having an open top end, a bottom end, and a sidewall extending therebetween defining an interior therein. A closure is engageable with the specimen collection container to seal the open top end. A mechanical separator is disposed within the interior and is adapted for separating a fluid specimen into first and second phases within the specimen collection container. The mechanical separator includes a one-way valve for isolating a first chamber portion of the interior from a second chamber portion of the interior. The one-way valve is transitionable from a closed position, in which the first chamber portion is in fluid isolation from the second chamber portion, to an open position, in which a portion of the fluid specimen may pass through the one-way valve from the first chamber portion to the second chamber portion. The apparatus further includes a sensing element capable of detecting the presence of a microorganism disposed within the interior of the specimen collection container.

The one-way valve may be transitionable from the closed position to the open position upon application of an applied rotational force. The one-way valve may be subsequently transitionable from the open position to the closed position upon cessation of the applied rotational force.

In one construction, a volume of fluid of the second chamber is from about 1 µl to about 500 µl. Alternatively, a volume of fluid of the second chamber is from about 5 µl to about 200 µl. The sensing element may include a sensor for detecting at least one of metabolic energy, carbon dioxide, pH, and volatile organic compounds. Optionally, the apparatus may include a lysis reagent disposed within the interior of the specimen collection container.

In accordance with yet another embodiment of the present invention, a method for detecting the presence of a microorganism in a fluid sample includes providing a fluid specimen within a specimen collection container having a sidewall defining an interior therein. The interior includes a mechanical separator adapted for separating the fluid sample into first and second phases within the specimen collection container and a sensing element capable of detecting the presence of a microorganism disposed therein. The method also includes subjecting the specimen collection container to applied rotational force to isolate a concentrated microorganism region, and detecting by a sensing element the presence or absence of a microorganism within the concentrated microorganism region.

The step of subjecting the specimen collection container to applied rotational force may be carried out in a centrifuge. The step of detecting the presence or absence of a microorganism may occur in less than 24 hours. Alternatively, the step of detecting the presence or absence of a microorganism may occur in less than 8 hours.

In certain configurations, the sensing element includes a sensor for detecting at least one of metabolic energy, carbon dioxide, pH, and volatile organic compounds. In certain constructions, a volume of fluid of the concentrated microorganism region is from about 1 µl to about 500 µl. Alternatively, a volume of fluid of the concentrated microorganism region is from about 5 µl to about 200 µl.

In accordance with yet another embodiment of the present invention, a method for isolating a microorganism in a fluid sample includes providing a fluid specimen within a specimen collection container having a sidewall defining an interior therein. The interior includes a mechanical separator adapted for separating the fluid sample into first and second phases within the specimen collection container and a sensing element capable of detecting the presence of microorganisms disposed therein. The method also includes subjecting the specimen collection container to applied rotational force such that the mechanical separator radially deforms to a first position in which the fluid sample can pass between the inner surface of the sidewall of the specimen collection container and the mechanical separator, and then, upon cessation of applied rotational force returns to a second position in which at least a portion of the mechanical separator circumferentially contacts the inner surface of the sidewall preventing the fluid sample from passing between the inner surface of the sidewall of the container and the mechanical separator. This creates a barrier between separated first and second phases of the fluid specimen. The microorganisms are present in one of the first and second phases and isolated from the other of the first and second phases.

The method may also include detecting by the sensing element the presence or absence of microorganisms within one of the first and second phases.

In accordance with still a further embodiment of the present invention, a method of concentrating microorganisms from a fluid sample includes providing a fluid specimen within a specimen collection container having a sidewall defining an interior therein. The method also includes providing a mechanical separator within the interior, the mechanical separator adapted to radially deform between a first position in which fluid can pass between the inner surface of the sidewall of the specimen collection container and the mechanical separator, and a second position in which at least a portion of the mechanical separator circumferentially contacts the inner surface of the sidewall preventing the fluid sample from passing between the inner surface of the sidewall of the container and the mechanical separator. The method still further includes subjecting the specimen collection container to centrifugation whereby the mechanical separator deforms and migrates axially within the interior, and whereby a higher density fraction of the fluid specimen migrates down the interior of the specimen collection container. The method also includes ceasing centrifugation whereby the mechanical separator forms a barrier between the higher density fraction of the fluid specimen and a lower density fraction of the fluid specimen. The method also includes providing a sensing element for detecting the presence or absence of a microorganism within the interior of the specimen collection container adjacent the higher density fraction of the fluid specimen.

The mechanical separator may have at least one feature selected from the group consisting of at least two regions of differing densities and a density gradient. The at least one feature may be selected based on a density of the whole liquid specimen such that the ratio of the volume of the separated higher density fraction to the lower density fraction is no greater than 1:5. Alternatively, the at least one feature is selected based on a density of the whole liquid specimen such that the ratio of the volume of the separated higher density fraction to the lower density fraction is no greater than 1:10. The sensing element may include a sensor for detecting at least one of metabolic energy, carbon dioxide, pH, and volatile organic compounds.

Further details and advantages of the invention will become clear from the following detailed description when read in conjunction with the accompanying drawings.

DESCRIPTION OF THE PREFERRED EMBODIMENTS

Figure 1:
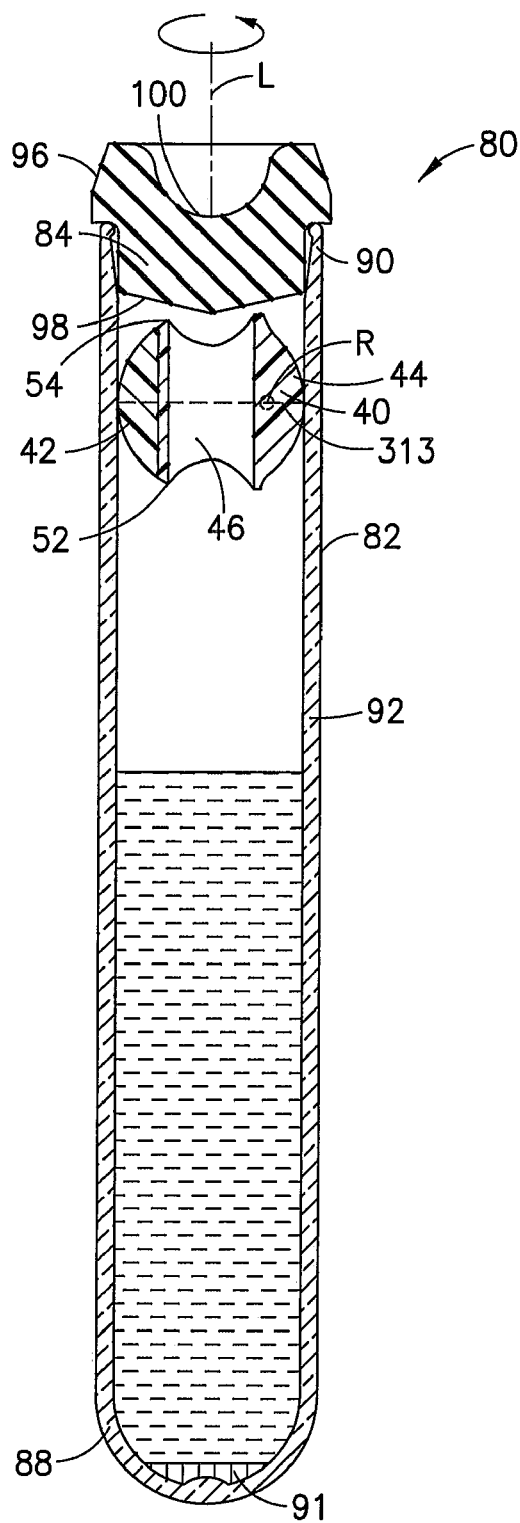
FIG. 1 is a cross-sectional front view of a specimen collection container having a mechanical separator disposed therein in an initial pre-separation condition in accordance with an embodiment of the present invention.

For purposes of the description hereinafter, the words "upper", "lower", "right", "left", "vertical", "horizontal", "top", "bottom", "lateral", "longitudinal", and like spatial terms, if used, shall relate to the described embodiments as oriented in the drawing figures. However, it is to be understood that many alternative variations and embodiments may be assumed except where expressly specified to the contrary. It is also to be understood that the specific devices and embodiments illustrated in the accompanying drawings and described herein are simply exemplary embodiments of the invention.

In accordance with an aspect of the present invention, a mechanical separator may be used within a specimen collection container for the purpose of providing separation of a fluid sample within the specimen collection container into higher and lower density phase components, as will be discussed herein. For example, the present mechanical separator can be used to provide a separation of higher and lower density phases through the use of differential buoyancy causing a sealing area of the mechanical separator to contract when submerged in a specimen and exposed to elevated gravitational forces through applied rotational force or centrifugation. In one embodiment, the elevated gravitational forces can be provided at a rate of at least 2,000 revolutions/minute, such as at least 3,400 revolutions/minute, in a standard centrifuge. In another embodiment, the elevated gravitational forces can be provided at a rate of at least 2,000 g force, such as at least 4,000 g force. The mechanical separator of the present invention may be used to isolate a heavier phase of a fluid specimen, including any microorganisms present within a blood specimen, from a lighter phase of the fluid specimen. The separation of the heavier phase from the lighter phase provides a higher concentration of microorganisms per unit of fluid in a separated sample as compared to the total volume of fluid drawn from a patient. By providing a concentrated microorganism region in which the microorganisms of a fluid specimen are separated from a volume of lighter phase blood components, the time required for inoculation and culture growth of the specimen can be significantly reduced, as will be discussed herein.

The time required to perform certain diagnostic tests, such as the detection of sepsis, may be significantly improved by the separation of a patient's whole blood sample into components, such as the lower density phase components, and any microorganisms present in the fluid sample (the higher density phase components). Samples of whole blood are typically collected by venipuncture through a cannula or needle attached to a syringe or an evacuated blood collection tube. After collection, separation of the blood into lower and higher density phases may be accomplished by rotation of the syringe or tube in a centrifuge. In order to maintain the separation, a barrier must be positioned between the higher density and lower density phase components. This allows the separated components to be subsequently examined and handled accordingly.

Figure 1A:
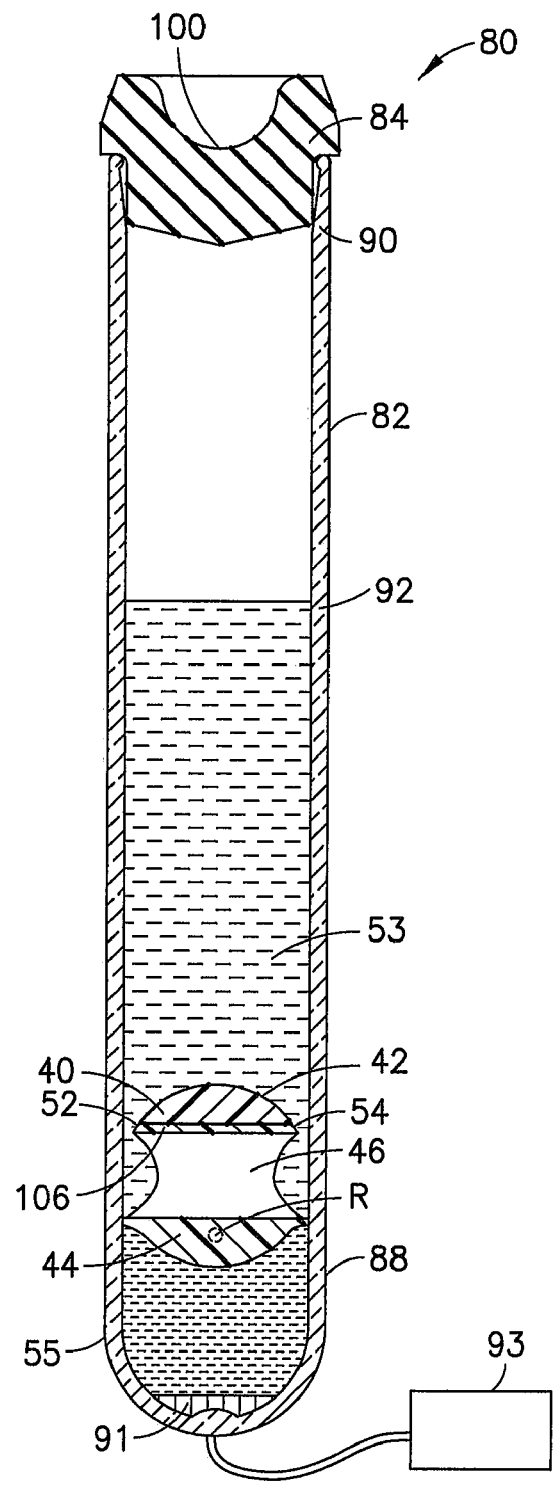
FIG. 1A is a cross-sectional front view of the specimen collection container having a mechanical separator disposed therein of FIG. 1 in a phase-separated condition in accordance with an embodiment of the present invention.

In accordance with an aspect of the present invention, as shown in FIGS. 1-1A, an apparatus 80 for detecting the presence of a microorganism in a fluid sample includes a specimen collection container 82 having an open top end 90, a closed bottom end 88, and a sidewall 92 extending therebetween defining an interior 94 therein.

Specifically, the collection container 82 may be a sample collection tube, such as a proteomics, molecular diagnostics, chemistry sample tube, blood, or other bodily fluid collection tube, coagulation sample tube, hematology sample tube, and the like. Desirably, collection container 82 is an evacuated blood collection tube. The collection container 82 may be adapted to receive a fluid specimen, such as blood, urine, sputum, saliva, cerebrospinal fluid, pleural fluid, and/or other bodily fluids. In other instances, the fluid specimen may be obtained from industrial, food, and cosmetic samples for microbiology cultures.

In one embodiment, the collection container 82 may contain additional additives as required for particular testing procedures, such as microbial growth enhancing agents, lysis reagents, and the like. Lysis reagents may be used to break down red blood cells for easier separation of microorganisms, as is known in the art. Such additives may be in particle or liquid form and may be sprayed onto the cylindrical sidewall 92 of the collection container 82 or located at the bottom of the collection container 82. The interior 94 includes an inside diameter extending substantially uniformly from the open top end 90 to a location substantially adjacent the closed bottom end 88 along the longitudinal axis L of the collection container 82, as shown in FIG. 1.

The collection container 82 may be made of one or more than one of the following representative materials: polypropylene, polyethylene terephthalate (PET), glass, or combinations thereof. The collection container 82 can include a single wall or multiple wall configurations. Additionally, the collection container 82 may be constructed in any practical size for obtaining an appropriate biological sample. For example, the collection container 82 may be of a size similar to conventional large volume tubes, small volume tubes, or microvolume tubes, as is known in the art. In one particular embodiment, the collection container 82 may be a standard 13 ml evacuated blood collection tube, as is also known in the art.

The open top end 90 is structured to at least partially receive a closure 84 therein to form a liquid impermeable seal. The closure 84 includes a top end 96 and a bottom end 98 structured to be at least partially received within the collection container 82. Portions of the closure 84 adjacent the top end 90 define a maximum outer diameter which exceeds the inside diameter of the collection container 82. In one embodiment, the closure 84 includes a pierceable resealable septum 100 penetrable by a needle cannula (not shown). Portions of the closure 84 extending downwardly from the bottom end 98 may taper from a minor diameter which is approximately equal to, or slightly less than, the inside diameter of the collection container 82 to a major diameter that is greater than the inside diameter of the collection container 82 at the top end 96. Thus, the bottom end 98 of the closure 84 may be urged into a portion of the collection container 82 adjacent the open top end 90. The inherent resiliency of closure 84 can insure a sealing engagement with the interior 94 of the cylindrical sidewall 92 of the collection container 82. In one embodiment, the closure 84 can be formed of a unitarily molded elastomeric material, having any suitable size and dimensions to provide sealing engagement with the collection container 82. Optionally, the closure 84 may be at least partially surrounded by a shield, such as a Hemogard® Shield commercially available from Becton, Dickinson and Company.

Referring to FIGS. 1-8, a mechanical separator 40 of the present invention may be disposed within the interior 94 and is adapted for separating a fluid sample within the collection container 82 into first and second phases within the collection container 82.

Referring to FIGS. 2-8, the mechanical separator 40 of the present invention includes a separator body 41 including a float 42 and a ballast 44 connected to the float 42. In one embodiment, the float 42 has a first density and the ballast 44 has a second density, with the second density being greater than the first density. In another embodiment, the float 42 has a first buoyancy and the ballast 44 has a second buoyancy, with the first buoyancy being greater than the second buoyancy. In one embodiment, it is desirable that the float 42 of the mechanical separator 40 be made from a material having a density that is lighter than the liquid or specimen intended to be separated into two phases. For example, if it is desired to separate human blood into serum and plasma, then it is desirable that the float 42 have a density of no more than about 1.020 g/cc. It is noted herein that although the term "serum" typically refers to the fluid portion of blood plasma after clotting factors (such as fibrinogen and prothrombin) have been removed, that "serum" as used herein may also include lysed red blood cell fragments and associated cellular structures. In one configuration, the float 42 of the mechanical separator 40 may be extruded and/or molded of a resiliently deformable and self-sealable material, such as a thermoplastic elastomer (TPE). In yet another embodiment, the float 42 may be extruded and/or molded of a resiliently deformable material that exhibits good sealing characteristics when contact is established with a collection container, as will be discussed herein. Maintenance of the float density within the specified tolerances is more easily obtained by using a standard material that does not require compounding with, for example, hollow glass micro-spheres in order to reduce the material density.

Figure 3:
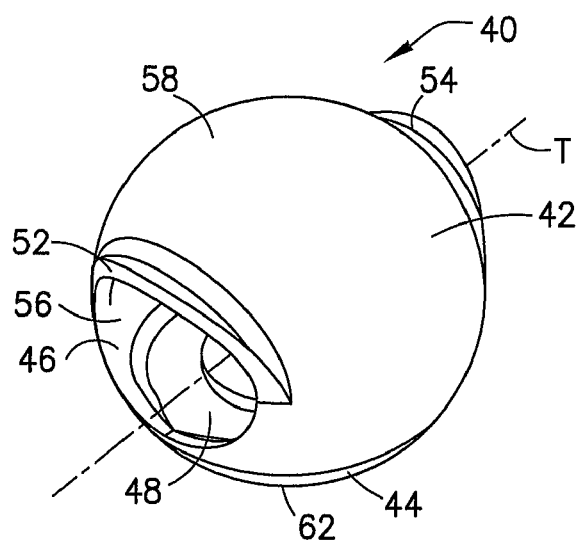
FIG. 3 is an alternative perspective view of the mechanical separator assembly of FIG. 2 in accordance with an embodiment of the present invention.
Figure 4:
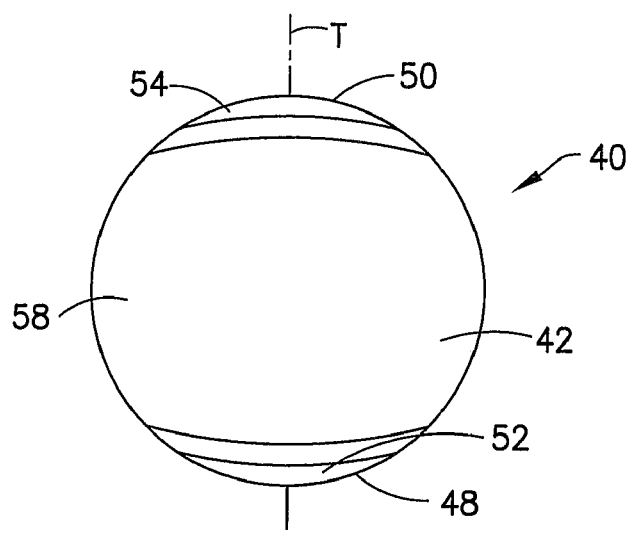
FIG. 4 is a top view of the mechanical separator of FIG. 2 in accordance with an embodiment of the present invention.
Figure 5:
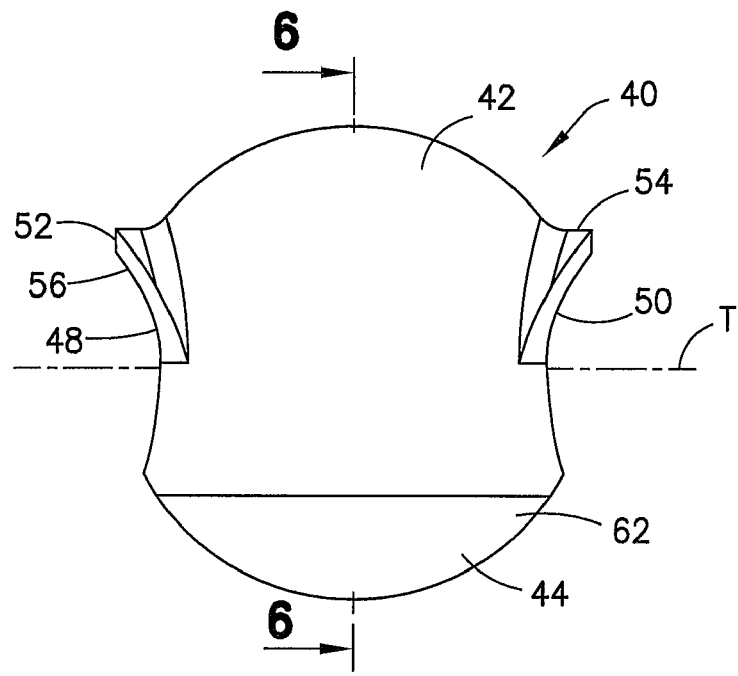
FIG. 5 is a side view of the mechanical separator of FIG. 2 in accordance with an embodiment of the present invention.
Figure 8:
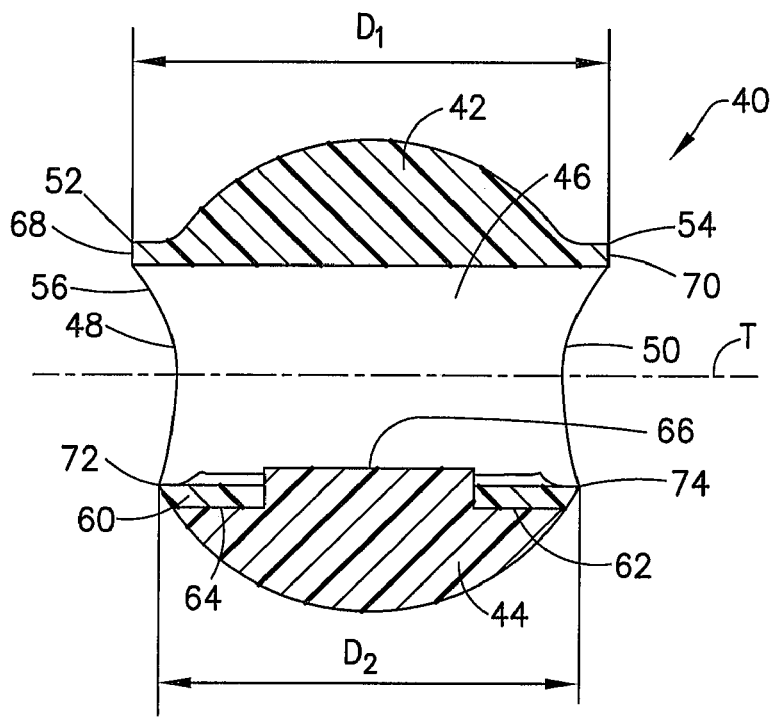
FIG. 8 is a cross-sectional view of the mechanical separator of FIG. 2 taken along line 8-8 of FIG. 7 in accordance with an embodiment of the present invention.

The mechanical separator 40 also includes a through-hole 46 defined therein, such as along a through-axis T of the separator body 41. As shown in FIGS. 3, 5, and 8, the through-hole 46 may extend through the entire separator body 41 and includes a first opening 48 and a second opening 50 aligned along the through-axis T. In one configuration, the through-hole 46 bisects or substantially bisects the volumetric center of the separator body 41. In one embodiment, the through-hole 46 is disposed entirely within the float 42. In a further embodiment, the float 42 may further include a first extended tab 52 adjacent the first opening 48 of the through-hole 46, and a second extended tab 54 adjacent the second opening 50 of the through-hole 46. The first extended tab 52 and/or the second extended tab 54 may be co-formed with the float 42, forming a portion of the float 42 itself. In another configuration, the first extended tab 52 and/or the second extended tab 54 may be separately formed and subsequently joined with the float 42. The first extended tab 52 and the second extended tab 54 may be provided above, such as substantially above, the through-axis T of the separator body 41. The first extended tab 52 and the second extended tab 54 may also be provided about, such as substantially about, a portion of the through-hole 46, such as in an outwardly-extending arcuate shape about an upper portion 56 of the through-hole 46. The first extended tab 52 and the second extended tab 54 may extend outwardly from the float 42 in a direction parallel or substantially parallel to the through-axis T of the separator body 41, such that the first extended tab 52 and the second extended tab 54 may have the same shape and curvature or substantially the same shape and curvature. In yet another embodiment, as shown in FIG. 8, the first extended tab 52 includes a first outermost edge 68 at the upper outermost portion of a first side of the through-hole 46, and the second extended tab 54 includes a second outermost edge 70 at the corresponding upper outermost portion of a second side of the through-hole 46. In one configuration, the first outermost edge 68 extends outwardly a distance that is greater than a lower outermost portion 72 of the first side of the through-hole 46. The second outermost edge 70 also extends outwardly a distance that is greater than a corresponding lower outermost portion 74 of the second side of the through-hole 46. Accordingly, the diameter $D_1$ of the separator body 41 taken about the first extended tab 52 and the second extended tab 54 about an upper portion of the through-hole 46 is slightly greater than the diameter $D_2$ of the separator body 41 taken about the lower portion of the through-hole 46 defined by the lower outermost portions 72, 74.

Figure 6:
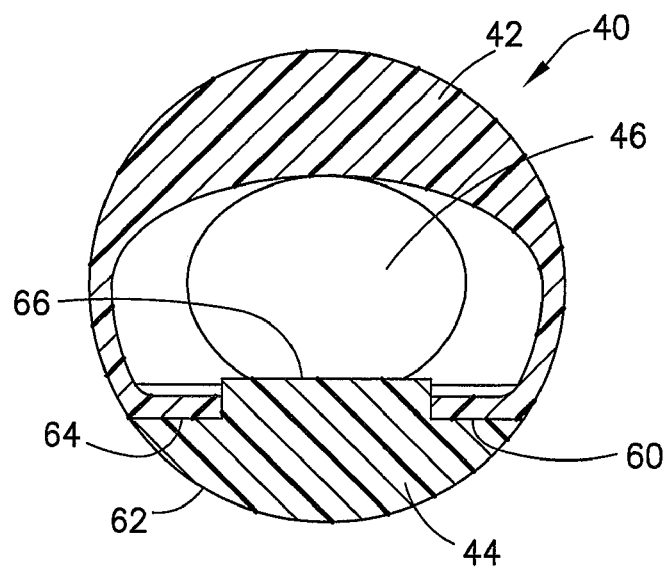
FIG. 6 is a cross-sectional view of the mechanical separator of FIG. 2 taken along line 6-6 of FIG. 5 in accordance with an embodiment of the present invention.

In one embodiment, the float 42 has an exterior surface 58 that is generally arcuate in shape, such as at least partially rounded or substantially rounded, and a joining surface 60, shown in FIGS. 6 and 8, adapted for engagement with a portion of the ballast 44. The ballast 44 also includes an exterior surface 62 that is also generally arcuate in shape, such as at least partially rounded or substantially rounded, and a contact surface 64, also shown in FIGS. 6 and 8, that is adapted for joining with the joining surface 60 of the float 42. In one embodiment, when taken together, the exterior surface 58 of the float 42 and the exterior surface 62 of the ballast 44 form a generally round exterior, such as a spheroid shape. It is understood herein that the term "spheroid shape" may include other configurations, in addition to a perfect sphere, that are aspects of the invention which may provide slightly non-uniform diameters taken through the mid-point. For example, different planes taken through the float 42 and ballast 44 which bisect the midpoint of the mechanical separator 40 may have varying diameters and still give rise to a generally rounded or ball-like mechanical separator 40 having a spheroid shape. In one embodiment, the float 42 and the ballast 44 may be separately formed and subsequently assembled. In another embodiment, the float 42 and the ballast 44 may be co-formed, such as co-extruded and/or co-molded, such as by a two-shot or multi-shot molding process such that both components are integrally linked together to form a complete separator body 41. In another configuration, this integral linkage between the float 42 and the ballast 44 may be created by a material bond between the two components, by a mechanical interlock, or by a combination of a material bond and a mechanical interlock. In addition, the float 42 and the ballast 44 may be linked together by a separate post-molding operation, such as adhesive, heat-staking, and/or ultrasonic welding. As shown in FIGS. 6 and 8, the ballast 44 may include an attachment protrusion 66 which assists in the engagement of the ballast 44 and the float 42.

In one embodiment, it is desirable that the ballast 44 of the mechanical separator 40 be made from a material having a higher density than the liquid intended to be separated into two phases. In one embodiment, the ballast 44 can be formed from mineral filled polypropylene. It is anticipated herein that both the float 42 and the ballast 44 could be formed of various other materials with sufficient biocompatibility, density stability, additive compatibility, neutrality to analyte interactions, adsorption, and leachability.

Figure 7:
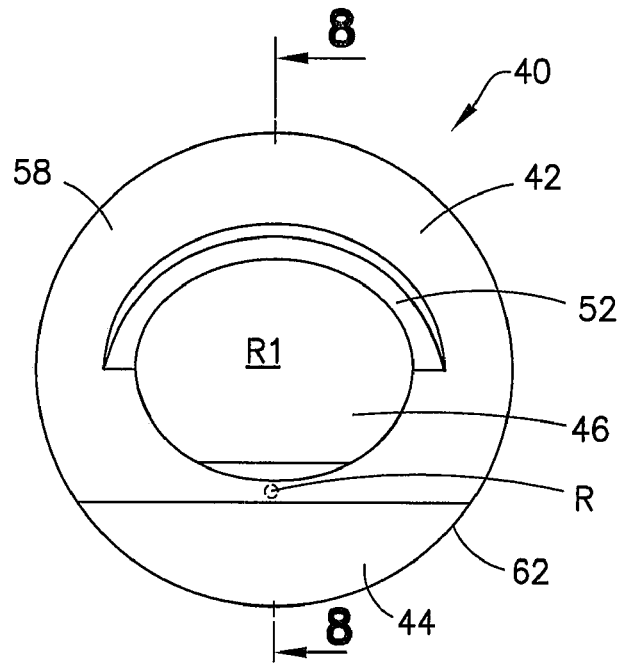
FIG. 7 is a front view of the mechanical separator of FIG. 2 in accordance with an embodiment of the present invention.

Due to the differential densities of the float 42 and the ballast 44, the mechanical separator 40 includes a center of mass R that is offset from the center of volume R1 of the separator body 41, as shown in FIG. 7. Specifically, the volume of the separator body 41 accounted for by the float 42 may be significantly greater than the volume of the separator body 41 accounted for by the ballast 44. Accordingly, in certain embodiments, the center of mass R of the separator body 41 may be offset from the through-hole 46. Additional features of similar mechanical structures suitable for use in the present invention are shown and discussed in United States Patent Publication No. 2010/0288694, the entire disclosure of which is hereby incorporated by reference.

As shown in FIGS. 1-1A, the apparatus 80 may also include a sensing element 91 capable of detecting the presence of a microorganism. In one configuration, the sensing element 91 may be located within the interior 94 and proximate the closed bottom end 88 of the specimen collection container 82. The sensing element 91 may include optical, electronic, thermal, electrochemical, impedance, capacitance, redox indicator, particle count and/or turbidity mechanisms. In one configuration, the sensing element 91 may be adapted to detect the presence of microorganisms, metabolic energy and/or metabolic products, such as carbon dioxide, pH, or volatile organic compounds produced during microbial growth. The sensing element 91 may be provided within the specimen collection container 82 such that the sensing element 91 is provided in communication with the second or heavier phase once separation is complete. In other embodiments, as shown in FIG. 1A, the sensing element 91 may be provided in wired or wireless communication with a detection module 93 for displaying the information gathered by the sensing element 91.

Figure 10:
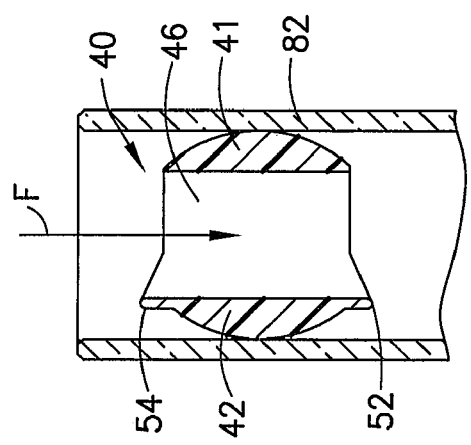
FIG. 10 is a partial cross-sectional front view of the specimen collection container of FIG. 9 having the mechanical separator provided therein in an initial pre-separation condition in accordance with an embodiment of the present invention.
Figure 9:
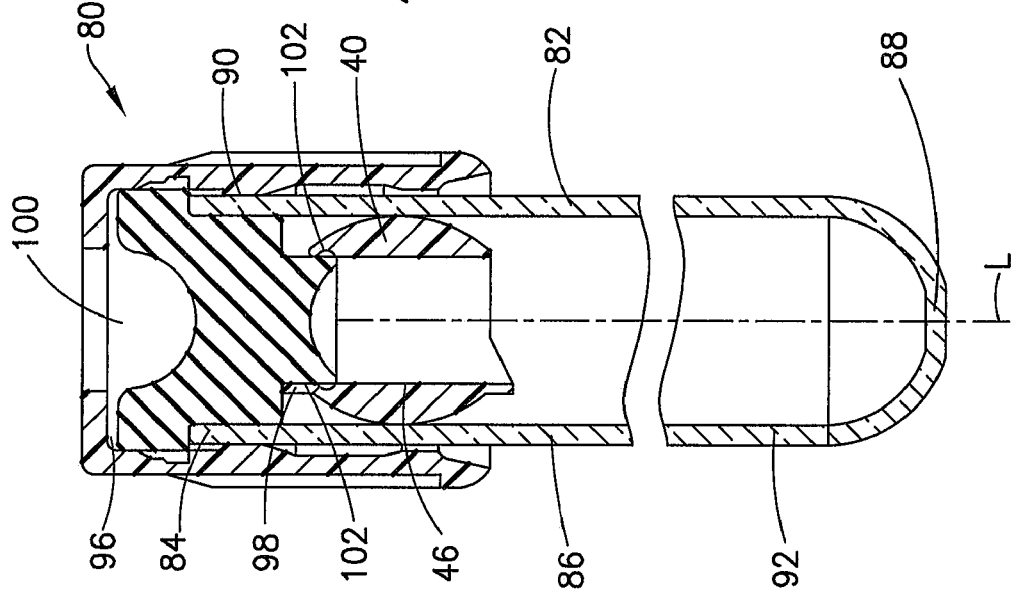
FIG. 9 is a cross-sectional front view of a specimen collection container having a mechanical separator disposed therein and releasably engaged with a portion of the closure in accordance with an embodiment of the present invention.

Referring to FIGS. 1, 9, and 10, in use, the mechanical separator 40 of the present invention may be oriented within the collection container 82 in an initial position in which the through-hole 46 of the mechanical separator 40 is aligned with the open top end 90 of the collection container 82. In the initial position, the through-hole 46 is adapted for allowing fluid to pass therethrough, such as from a needle cannula (not shown) which has pierced the pierceable septum 100 of the closure 84 and is provided in fluid communication with the interior 94 of the collection container 82. In another embodiment, as shown in FIG. 9, the mechanical separator 40 may also be releasably engaged with a portion of the closure 84 and/or sidewall 92 of the specimen collection container 82. In the initial position, a fluid specimen, such as a blood specimen potentially including a microbial organism or plurality of microbial organisms, is introduced into the specimen collection container 82. The specimen may pass through the through-hole 46 of the mechanical separator 40 and be received within the bottom portion of the interior 94.

Figure 11:
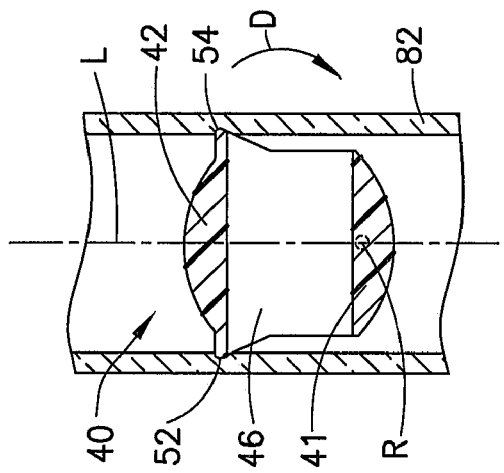
FIG. 11 is a partial cross-sectional front view of the specimen collection container of FIG. 9 having the mechanical separator provided therein in a phase-separated condition in accordance with an embodiment of the present invention.

The mechanical separator 40 may be adapted to transition from the initial position, as shown in FIGS. 1, 9, and 10, to a sealing position, as shown in FIGS. 1A and 11. In the initial position, the through-hole 46 is oriented in an open position for allowing fluid to pass therethrough in the direction indicated in FIG. 10 by flow arrow F. Referring to FIG. 9, the initial open position of the through-hole 46 is substantially aligned with the longitudinal axis L of the collection container 82. Referring to FIG. 11, upon application of rotational force, such as during centrifuge, the mechanical separator 40 deforms sufficiently to disengage from the initial position and/or engagement with the closure 84 and rotate in the direction shown by directional arrow D of FIG. 11 to the sealing position in which the through-hole 46 is in a substantially closed position. In the substantially closed position, the float 42, including the first extended tab 52 and the second extended tab 54, forms a sealing engagement with the interior 94 of the collection container 82 substantially preventing fluid from being received through the through-hole 46 or around the separator body 41.

In one configuration, the through-hole 46 is substantially aligned with the open top end 90 of the collection container 82 along at least a portion of the longitudinal axis L in the open position, and the through-hole 46 is substantially aligned perpendicular to the longitudinal axis in the closed position. It is noted that transition of the through-hole 46 from the open position to the closed position coincides with the rotation of the mechanical separator 40 from a first initial position to a second closed position. In another configuration, the mechanical separator 40 is engaged with a portion of the closure 84 and/or sidewall 92 of the specimen collection container 82 in the first initial position, and the mechanical separator 40 is engaged with a portion of the sidewall 92 of the collection container 82 in the second sealing position.

Upon application of rotational force and transition of the mechanical separator 40 as shown in FIG. 11, the mechanical separator 40 experiences a rotational moment while still attached to the closure 84 and, after release from the closure 84, rotates approximately 90° to become oriented with the ballast 44 facing the bottom end 88 of the collection container 82.

Once the mechanical separator 40 contacts the fluid contained within the collection container 82, air that occupies the through-hole 46 is progressively displaced by the fluid as the device submerges. When the mechanical separator 40 is submerged in the fluid, the float 42 has a greater buoyancy than the ballast 44, which generates a differential force across the mechanical separator 40. During centrifugation, the differential force causes the float 42 component to elongate and contract away from the sidewall 92 of the collection container 82, thereby reducing the effective diameter and opening a communicative pathway for the flow of fluid, such as higher and lower density phase components, past the separator body 41. As the mechanical separator 40 radially deforms, it migrates axially within the interior 94, and a lighter density fraction 53 migrates upwards in the interior 94 while a heavier density fraction 55 of the fluid specimen migrates down the interior 94 of the specimen collection container 82, as shown in FIG. 1A.

It is noted that the float 42 may be adapted for deformation in a direction substantially perpendicular to the through-hole 46. In the initial position, as shown in FIG. 1, the mechanical separator 40 forms a seal 313 with the sidewall 82. As the applied rotational force is removed, the float 42 recovers and the sealing area defined by the float 42 and the first extended tab 52 and the second extended tab 54 re-expands to seal against the interior 94 of the collection container 82 along a second sealing perimeter 106, as shown in FIG. 1A. Accordingly, the mechanical separator 40 is adapted to prevent fluid from passing between or around the separator body 41 and the collection container 82, and also prevents fluid from passing through the through-hole 46, effectively establishing a barrier. The second sealing perimeter 106 establishes a barrier between higher and lower density phases within the sample.

Figure 2:
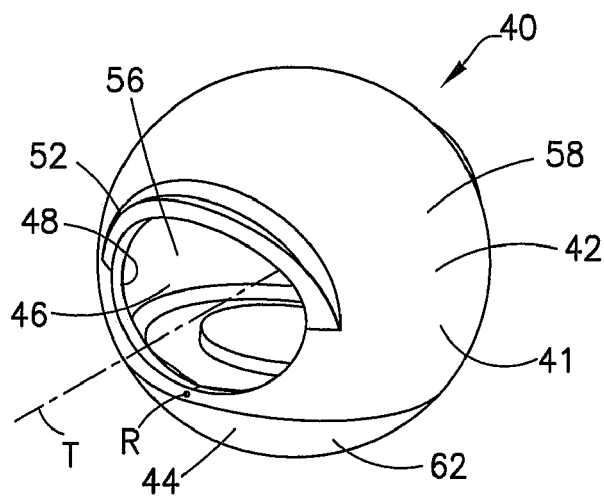
FIG. 2 is a perspective view of a mechanical separator assembly having a float defining a through-hole and a ballast in accordance with an embodiment of the present invention.

In certain configurations, the separator body 41 may include a center of mass R that is offset from the through-axis T, shown in FIG. 2, of the separator body 41. In this configuration, the mechanical separator 40 is transitionable from a first position (such as shown in FIGS. 1, 9, and 10) in which the mechanical separator 40 is engaged with a portion of the closure 84 (shown in FIG. 9) or a portion of the sidewall 92 of the collection container 82 (shown in FIGS. 1 and 10) and the center of mass R is oriented on a first side of the longitudinal axis L of the collection container 82, to a second position, such as shown in FIGS. 1A and 11, in which the mechanical separator 40 is disengaged from the closure or initial engagement position with the collection container 82, and the center of mass R is oriented on the longitudinal axis L of the collection container 82. At some point, during the transition of the center of mass R to the longitudinal axis L of the collection container 82, the float 42 of the mechanical separator 40 must deform in a direction substantially perpendicular to the through-axis T of the separator body 41 in order to allow for transition of the mechanical separator 40 from the initial first position to the second sealing position. During elongation of the float 42, the higher and lower density phases of the specimen may pass between the mechanical separator 40, specifically the elongated float 42, and the sidewall 92 of the collection container 82 in which the mechanical separator 40 is in an intermediate position. From the intermediate position, the mechanical separator 40 may subsequently transition to the sealing position, in which a portion of the float 42 forms a sealing engagement with a portion of the interior of the collection container, upon termination of applied rotational force.

Accordingly, the mechanical separator of the present invention may be considered to transition between three phases of operation: the initial phase in which a specimen is provided through the through-hole of the separator body; the intermediate phase in which the separator has disengaged from the initial position and the float 42 and/or deformable sealing member is elongated to allow passage of higher and lower density phases thereby; and the sealing phase in which the float 42 and/or deformable sealing member forms a barrier with a portion of the collection container. During this sequence of phases, the mechanical separator may be considered as "open-open-closed" wherein an "open" phase is defined as a state in which the mechanical separator does not form a sealing barrier with the collection container preventing the passage of fluid therethrough and therearound. In contrast, a "closed" phase is defined as a state in which mechanical separator 40 does form a sealing barrier with the collection container preventing the passage of fluid therethrough and therearound.

When the assembly is subjected to an applied rotational force, such as centrifugation, the respective phases of the specimen, such as blood, will begin to separate into a denser phase displaced toward the bottom of the collection container, and a less dense phase displaced toward the top of the collection container. The applied rotational force will urge the ballast of the mechanical separator toward the closed bottom end of the specimen collection container and the float toward the top end of the collection container. This movement of the ballast will generate a longitudinal deformation of the float. As a result, the float and/or deformable sealing member will become longer and narrower and will be spaced concentrically inward from the inner surface of the cylindrical sidewall of the collection container. Accordingly, lighter phase components of the blood will be able to slide past the float and/or deformable sealing member and travel upwards, and likewise, heavier phase components of the blood will be able to slide past the float and travel downwards.

As noted above, the mechanical separator of the present invention typically has an overall density between the densities of the separated phases. Consequently, the mechanical separator will stabilize in a position within the collection container such that the heavier phase components will be located between the mechanical separator and the closed bottom end of the collection container, while the lighter phase components will be located between the mechanical separator and the top end of the collection container. After this stabilized state has been reached, the centrifuge will be stopped and the float and/or deformable sealing member will resiliently return to its unbiased state and into sealing engagement with the interior of the cylindrical sidewall of the collection container. In a further embodiment, the mechanical separator may have an overall density that is greater than the density of the separated phases if a mechanical stop is integrated within the device at a predetermined position above the denser separated phase. The float density must still be less than the density of the separated phases, however, the ballast may be of any density above the density of the separated phases and is not constrained or limited.

As the microbial organisms typically have greater density than other components of a blood sample, when the blood sample is subjected to centrifugation, any microorganisms present within the blood sample will typically migrate down the specimen collection container 82 to the closed bottom end 88 during the intermediate phase. Once centrifugation is ceased and the mechanical separator is provided in the sealing position, the mechanical separator effectively traps the microorganisms within the isolated second or heavier phase, thereby forming a concentrated microorganism region which is isolated from the remainder of the fluid specimen. In one embodiment, the final culture volume confined within the concentrated microorganism region is between 1 and 2000 µl such as 1 and 500 µl such as between 5 and 200 µl. In another embodiment, the volume of the second phase forming the concentrated microorganism region is less than 20% of the total volume of the fluid sample within the specimen collection container.

In still another embodiment, a buoyancy feature of the mechanical separator 40 is selected based on the density of the whole liquid specimen such that the ratio of the volume of the separated higher density fraction to the lower density fraction is no greater than 1:5. In another embodiment, a buoyancy feature of the mechanical separator 40 is selected based on the density of the whole liquid specimen such that the ratio of the volume of the separated higher density fraction to the lower density fraction is no greater than 1:10. In this manner, the volumetric relationship between the isolated higher density and lower density phases may be determined based on a property of the mechanical separator 40.

In use, once a positive culture has been detected by the sensing element in the isolated phase region, the isolated second phase including any microorganisms may be inoculated on a standard growth media and provided within an incubator, such as within a Bactec™, commercially available from Becton, Dickinson and Company. The growth media may be cultured according to standard industry procedures for determining the presence and type of microorganism present within the sample. In one embodiment, the growth media may be co-formed with the sensing element 91 and provided within the specimen collection container 82.

Figure 23:
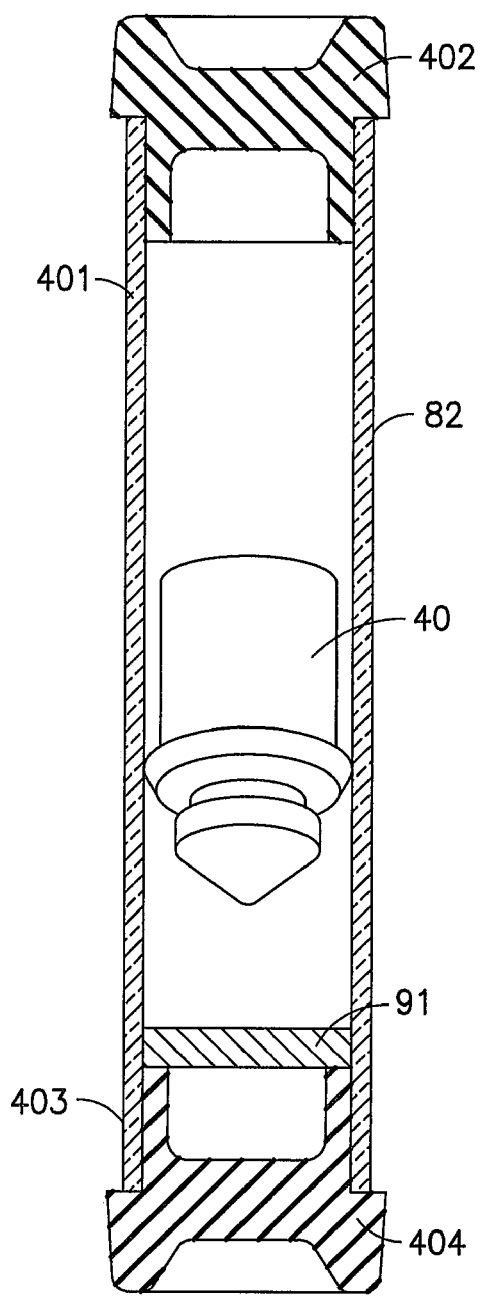
FIG. 23 is a partial perspective cross-sectional view of a specimen collection container in accordance with an embodiment of the present invention.

In one embodiment, a blood sample may be collected directly into the collection container 82 containing the mechanical separator 40, lysis reagent, and microorganism growth media. This system allows for combined collection and detection in a single vessel without exposing the blood specimen to atmosphere, thereby reducing potential sample contamination. This system also reduces the exposure risk of lab testing personnel to potential blood-borne pathogens. In another embodiment, as shown in FIG. 23, the specimen collection container 82 may include a first open end 401 having a closure 402 engaged therewith and a second open end 403 having a second closure 404 engaged therewith. After centrifugation, the separated lighter first phase may be withdrawn from the first open end 401 above the mechanical separator 40, and the separated denser phase may be withdrawn from the second open end 403 below the mechanical separator 40. As discussed elsewhere herein, the growth media may be co-formed with the sensing element 91 and provided in communication with the separated denser phase adjacent the second open end 403. Additional specimen collection containers including dual-closures suitable for use with the present invention are known, for example, in United States Patent Publication No. 2005/0059163, the entire disclosure of which is hereby incorporated by reference. In another embodiment, the growth media may be provided separately from the specimen collection container 82 and the isolated second phase, including any microorganisms, may be withdrawn from the specimen collection container 82 and inoculated on the separately provided growth media. Once sufficient growth time has passed, a standard microbial sensing element 91 is used to identify the presence and type of microorganism present within the inoculated sample. In accordance with an embodiment of the present invention, the step of detecting the presence or absence of a microorganism occurs in less than 24 hours from isolation of the concentrated microbial region from the remainder of the whole blood sample. In accordance with another embodiment of the present invention, the step of detecting the presence or absence of a microorganism occurs in less than 8 hours from isolation of the concentrated microbial region from the remainder of the whole blood sample. Faster detection may be achieved due to the fact that microorganisms are emitting products of metabolism, such as carbon dioxide gas, into a much smaller sample volume so that changes in gas concentrations that are detected by the sensing element are occurring faster.

It is noted herein that alternative mechanical separators may be used in the present system, including a mechanical separator 140, as shown in FIGS. 12-16. In accordance with another embodiment of the present invention, the mechanical separator 140 includes a separate deformable bellows 142 having an upper end 144 and a lower end 146 and a sealing portion 148 disposed therebetween providing sealing engagement with a sidewall 150 of a specimen collection container 182 in an initial position. The bellows 142 may be extruded and/or molded of a resiliently deformable material that exhibits good sealing characteristics with the tube material(s). The bellows 142 are generally symmetrical about a longitudinal axis and can be made of any sufficiently elastomeric material sufficient to form a liquid impermeable seal with the cylindrical sidewall 150 of the specimen collection container 182. In one embodiment, the bellows 142 are made of TPE and have an approximate dimensional thickness of from about 0.020 inch to about 0.050 inch.

The mechanical separator 140 also includes a float 160, having a first density, and engaged with a portion of the bellows 142. The mechanical separator 140 also includes a ballast 162, having a second density, the second density being greater than the first density, engaged with a second portion of the bellows 142.

Figure 12:
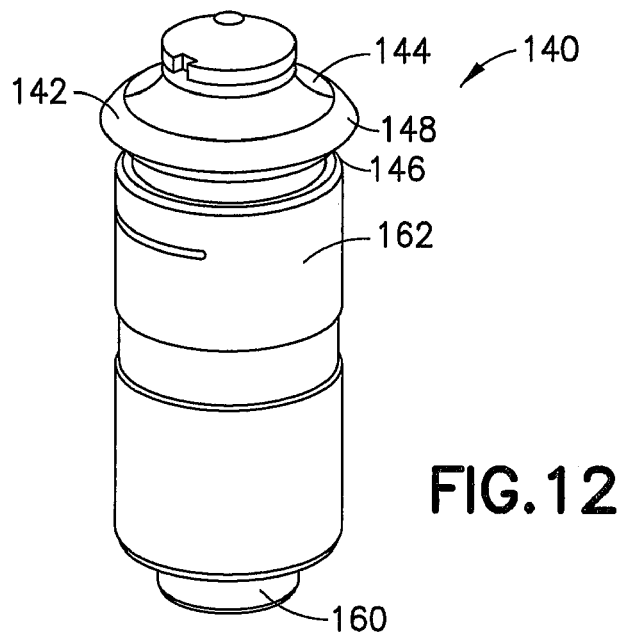
FIG. 12 is a perspective front view of a mechanical separator having a float, a ballast, and a deformable bellows in accordance with an embodiment of the present invention.
Figures 13, 14:
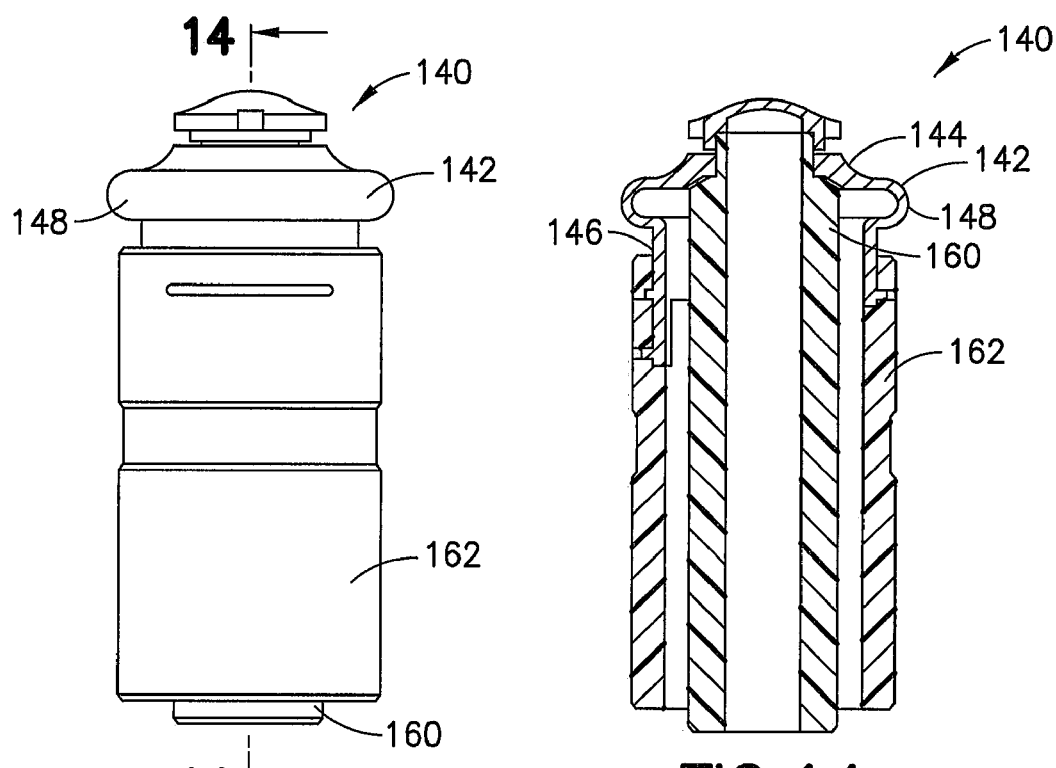
FIG. 13 is a front view of the mechanical separator of FIG. 12 in accordance with an embodiment of the present invention.
FIG. 14 is a cross-sectional view of the mechanical separator of FIG. 13 taken along line 14-14 of FIG. 13 in accordance with an embodiment of the present invention.
Figure 15:
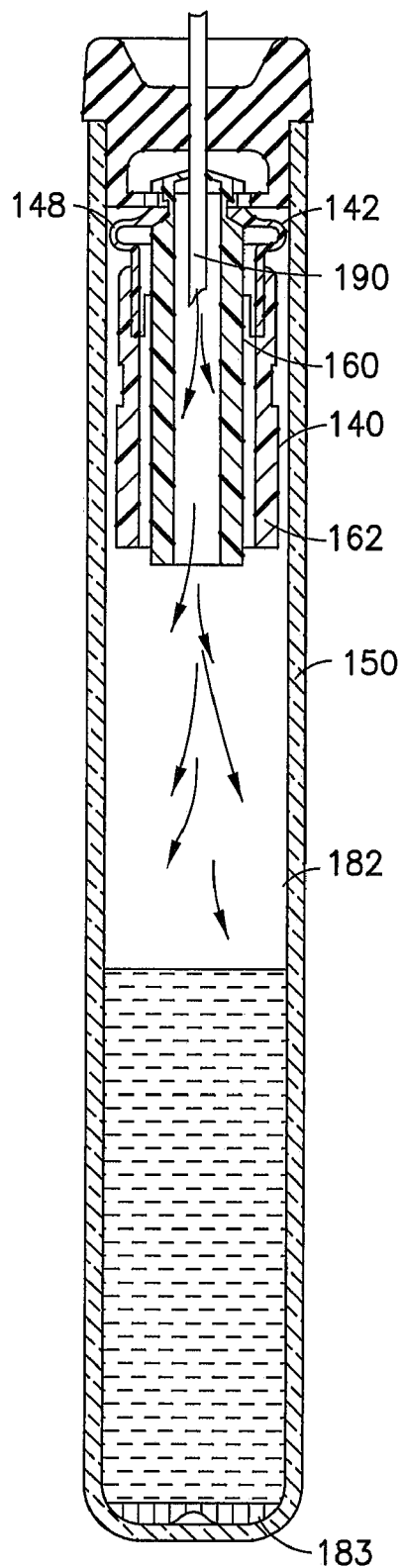
FIG. 15 is a cross-sectional front view of the mechanical separator of FIG. 12 disposed within a specimen collection container during specimen transfer in accordance with an embodiment of the present invention.
Figure 16:
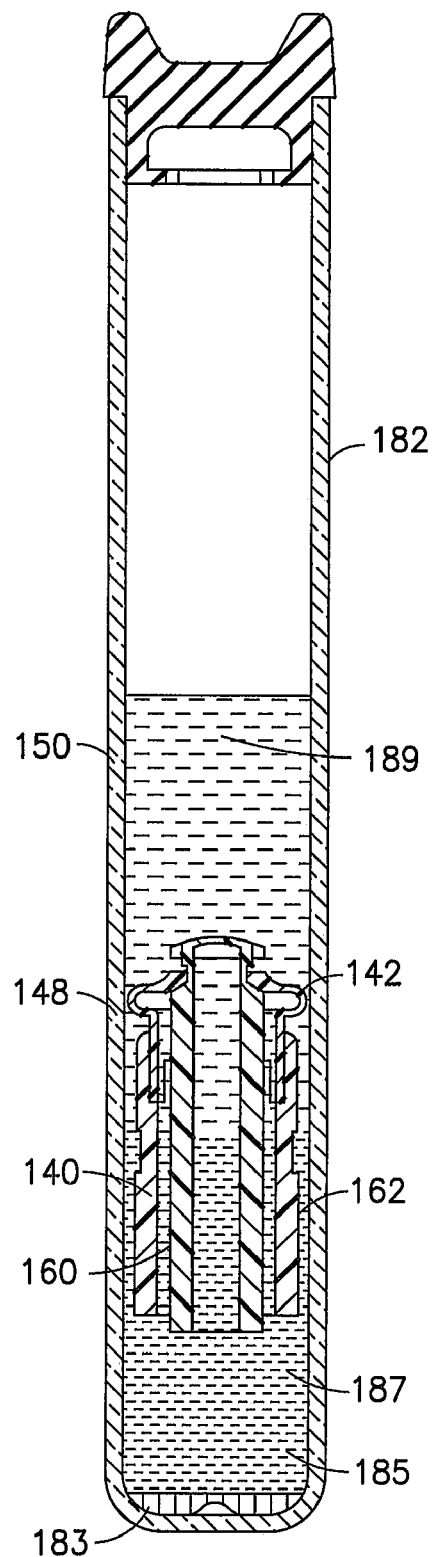
FIG. 16 is a cross-sectional front view of the mechanical separator of FIG. 12 disposed within a specimen collection container after phase-separation in accordance with an embodiment of the present invention.

In use, a needle cannula 190, as shown in FIG. 15, may be used to pierce a portion of the bellows 142, such as a pierceable head portion 192, as shown in FIG. 12, to introduce a blood specimen into the specimen collection container 182. As similarly described above, upon application of an applied rotational force, the float 160 and ballast 162 are urged in opposite directions which apply pressure to the deformable bellows 142 and cause elongation of the deformable bellows 142. The elongation of the deformable bellows 142 causes the sealing portion 148 to release from contact with the sidewall 150 and allow for passage of fluid therearound, as discussed above. Lighter fractions of a blood specimen 189, as shown in FIG. 16, will migrate upwards in the specimen collection container 182 past the deformable bellows 142, while heavier fractions of a blood specimen 187, as also shown in FIG. 16, will migrate downwards in the specimen collection container 182 past the deformable bellows 142. Once centrifugation is ceased, the deformable bellows 142 re-seals with a portion of the sidewall 150 of the specimen collection container 182, thereby creating an effective barrier between the lighter fraction 189 and the heavier fraction 187 forming a concentrated microorganism region 185 adjacent a sensing element 183, as shown in FIG. 16. The sensing element 183 may be positioned within the space containing the second or heavier phase of the separated fluid sample.

In one embodiment, it is desirable that the float 160 of the mechanical separator 140 be made from a material having a density lighter than the liquid intended to be separated into two phases. For example, if it is desired to separate human blood into heavier and lighter fractions, then it is desirable that the float 160 have a density of no more than about 0.902 gm/cc. In another embodiment, the float 160 can be formed from polypropylene. In another embodiment, it is desirable that the ballast 162 of the mechanical separator 140 be made from a material having a density heavier than the liquid intended to be separated into two phases. For example, if it is desired to separate human blood into heavier and lighter phases, then it is desirable that the ballast 162 have a density of at least 1.326 gm/cc. In one embodiment, the ballast 162 can be formed from PET.

Additional features of similar mechanical structures suitable for use in the present invention are shown and discussed in United States Patent Publication No. 2010/0155319, the entire disclosure of which is hereby incorporated by reference.

Figure 17:
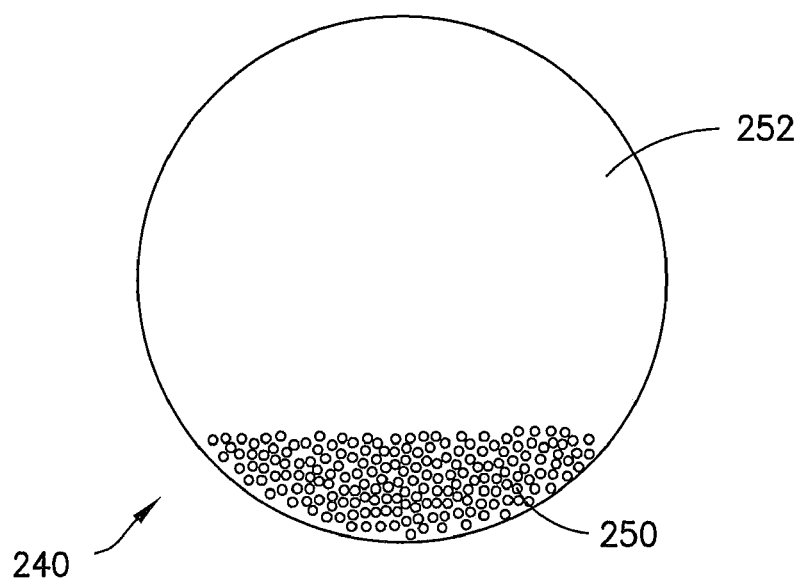
FIG. 17 is a front view of a spherical mechanical separator in an initial pre-separation condition in accordance with an embodiment of the present invention.
Figure 18:
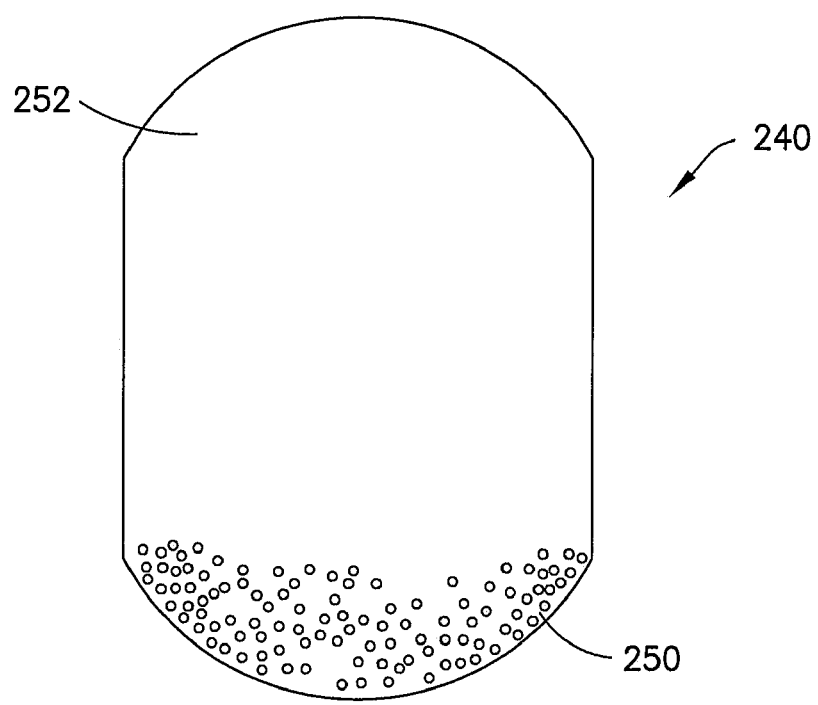
FIG. 18 is a front view of the spherical mechanical separator of FIG. 17 during centrifugation in accordance with an embodiment of the present invention.

In an alternative configuration, a mechanical separator 240 suitable for use in the present invention includes a density gradient having a region of higher density and a region of lower density. Referring to FIGS. 17-18, the mechanical separator 240 may be formed of a unitary construction in which a first region 250 has a density that is greater than the fluid intended to be separated, and a second region 252 has a density that is less than the fluid intended to be separated. In use, the mechanical separator 240 is dimensioned to provide sealing contact with the sidewalls of the specimen collection container (shown with reference to FIGS. 1 and 1A). As discussed above, upon application of an applied rotational force, the first region 250 is drawn downwards in the specimen collection container and the second region 252 is urged upwardly in the specimen collection container, thereby elongating the mechanical separator 240 and releasing the seal with the sidewall of the specimen collection container. Once centrifugation has ceased, the mechanical separator 240 returns to a sealing position and establishes a fluid barrier between the lighter and heavier phases within the specimen collection container, as described above.

Figure 19:
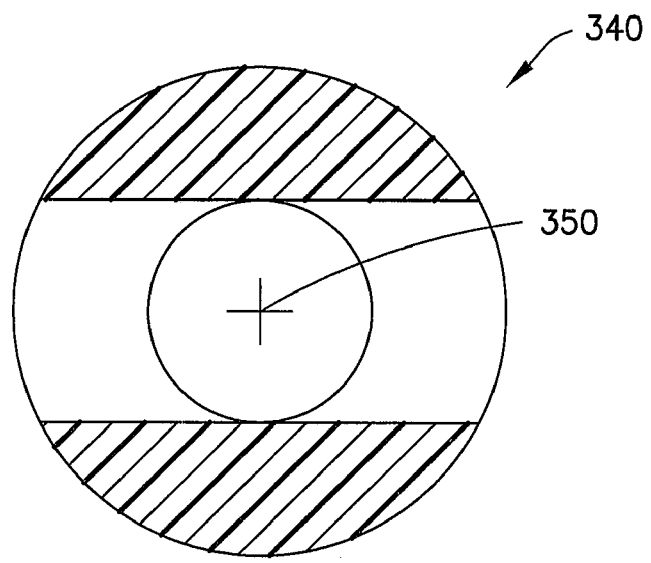
FIG. 19 is a cross-sectional top view of mechanical separator having a one-way valve in a sealed condition in accordance with an embodiment of the present invention.
Figure 20:
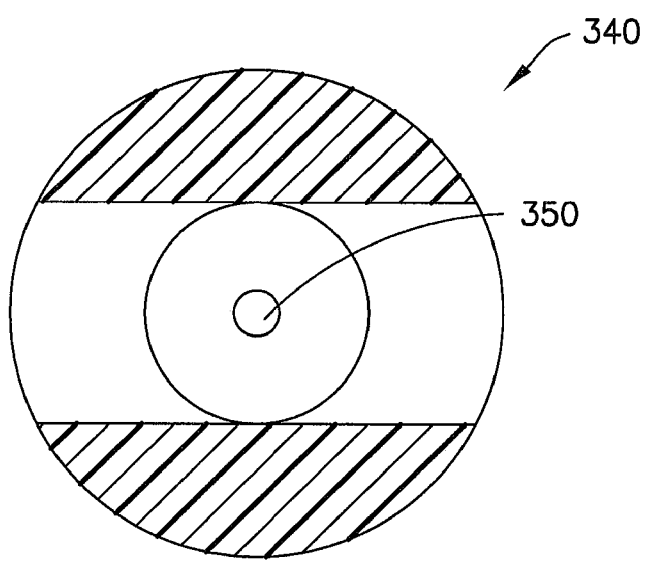
FIG. 20 is a cross-sectional top view of the mechanical separator of FIG. 19 during centrifugation in accordance with an embodiment of the present invention.

In accordance with still a further embodiment, a mechanical separator 340, as shown in FIGS. 19-20, may include a one-way valve 350 suitable for isolating a first chamber portion of the interior of the specimen collection container from a second chamber of the interior. The one-way valve 350 may be transitionable from a closed position, shown in FIG. 19 in which a first chamber portion is in fluid isolation from a second chamber portion, to an open position shown in FIG. 20 in which a portion of the fluid specimen may pass through the one-way valve 350 from the first chamber portion to the second chamber portion. It is intended herein that the one-way valve 350 may be incorporated into a mechanical separator body, as described elsewhere herein, or may be provided as a disc integrally formed with a portion of the specimen collection container, such as disposed across the longitudinal axis. The one-way valve 350 may include a radially deformable elastomeric material which is capable of transitioning from the closed position to the open position upon application of an applied rotational force, and re-transitioning from the open position to the closed position upon cessation of the applied rotational force.

Additional mechanical separators suitable for use with the present invention are described in U.S. Pat. Nos. 7,947,236, 6,803,022, and 6,479,298, each assigned to Becton, Dickinson and Company and incorporated herein by reference.

Other fluid specimens, such as urine, sputum, saliva, cerebrospinal fluid, pleural fluid, and other bodily fluids may also be used in conjunction with the present invention. In the case of sputum, the sample may be processed first by conventional methods before it is introduced into the specimen collection container including a mechanical separator, sensor, and microorganism growth media. Sputum sample processing is well-known to those skilled in the art of tuberculosis culturing. It is also noted that the present invention may be used for still other fluid specimens obtained from industrial, food, and cosmetic samples for microbiology cultures.

EXAMPLES

Example 1

Figure 21:
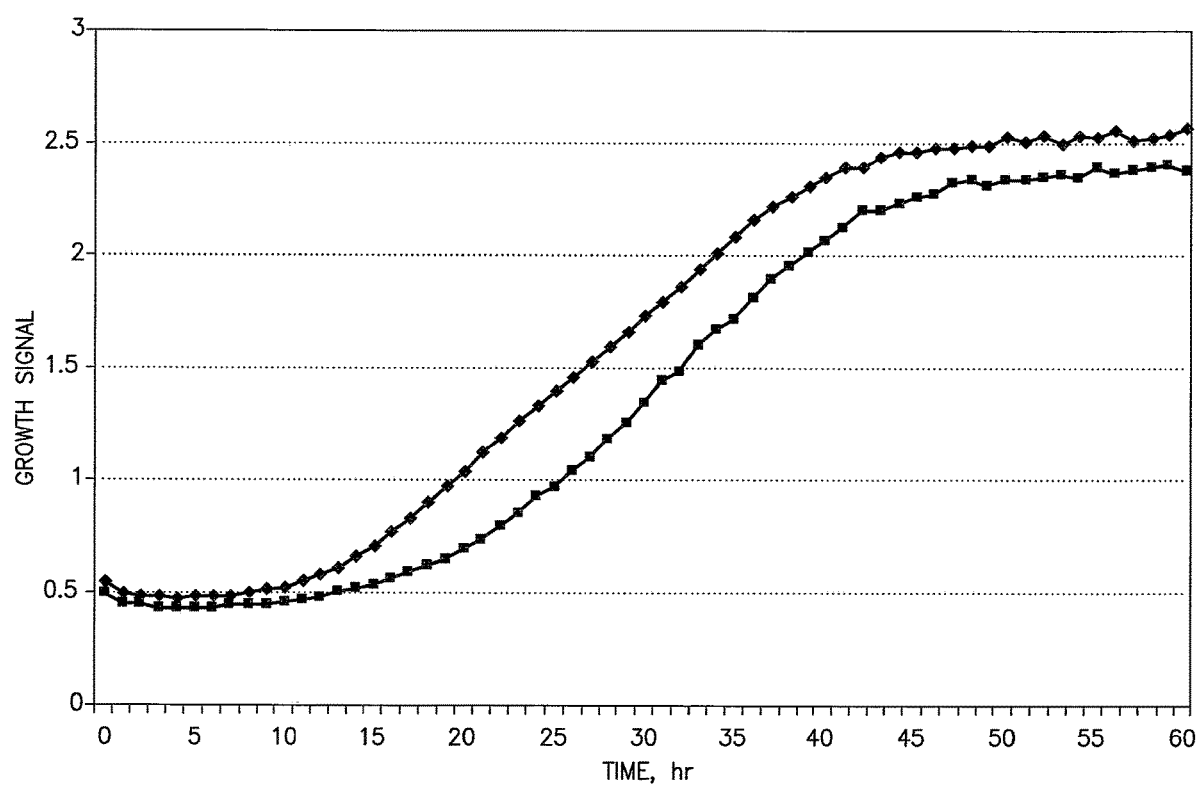
FIG. 21 is a graphical representation of microorganism signals over time for *Staph aureus* in accordance with an embodiment of the present invention.

Blood culture tests were performed with *Staph aureus* using tubes with mechanical separators as described herein with reference to FIGS. 1-11 There were solid-state oxygen sensors on the bottoms of the tubes. A mixture comprised of 4 ml of aerobic lytic growth media, 4 ml of blood, and 10-100 cfu organisms were inoculated into each tube. The aerobic lytic growth media contains saponin as lysis reagents and growth nutrients to support microorganism growth. The tubes were then centrifuged at 2200×g for 10 minutes and the mechanical separator spun down to the bottom of the tube, creating about 500 µl of space for organism growth. The growth curves of the two strains of *Staph aureus* are shown in FIG. 21. The Time-To-Detection (TTD) for those two strains are 9 hrs, which are 25% faster than the TTDs from BACTEC blood cultures Standard Aerobic media, which are normally 12 hrs.

Example 2

Figure 22:
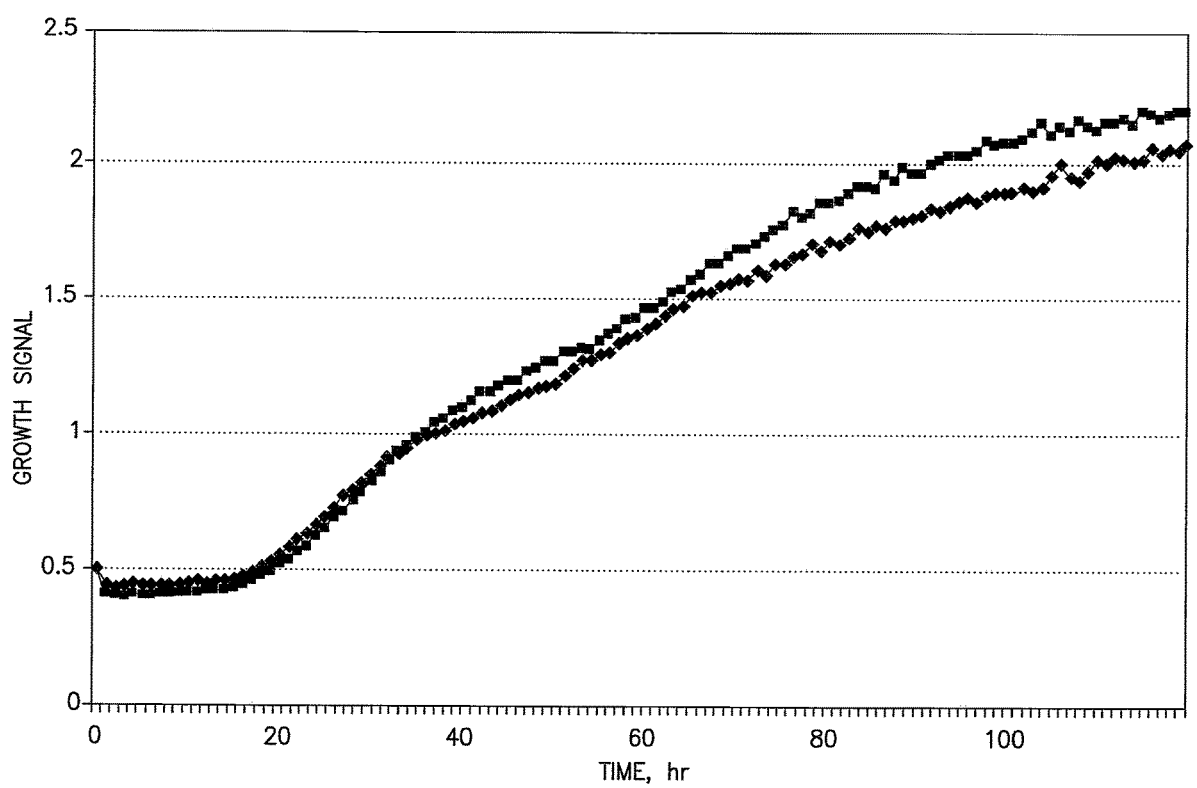
FIG. 22 is a graphical representation of microorganism signals over time for *Candida glabrata* in accordance with an embodiment of the present invention.

Blood culture tests were performed with *Candida glabrata* using tubes with mechanical separators as described herein with reference to FIGS. 1-11. There were solid-state oxygen sensors on the bottoms of the tubes. A mixture comprised of 4 ml of aerobic lytic growth media, 4 ml of blood, and 10-100 cfu organisms were inoculated into each tube. The aerobic lytic growth media contains saponin as lysis reagents and growth nutrients to support microorganism growth. The tubes were then centrifuged at 2200×g for 10 minutes and the mechanical separator spun down to the bottom of the tube, creating about 500 µl of space for organism growth. The growth curves of the two strains of *Candida glabrata* are shown in FIG. 22. The Time-To-Detection (TTD) for those two strains are 14 hrs and 18 hrs, which are 25% faster than the TTDs from BACTEC blood cultures Standard Aerobic media.

While the present invention is described with reference to several distinct embodiments, those skilled in the art may make modifications and alterations without departing from the scope and spirit. Accordingly, the above detailed description is intended to be illustrative rather than restrictive.

The invention claimed is:

1. An apparatus for detecting the presence of a microorganism, comprising:
   a specimen collection container comprising an open top end, a bottom end, and a sidewall extending therebetween defining an interior therein;
   a closure engageable with the specimen collection container to seal the open top end;
   a mechanical separator disposed within the interior and adapted for separating a fluid sample into first and second phases within the specimen collection container, the mechanical separator having at least one feature selected from the group consisting of at least two regions of differing densities and a density gradient; and
   a sensor device disposed within the interior of the specimen collection container and capable of detecting the presence of a microorganism present within the interior of the specimen collection container.

2. The apparatus of claim 1, wherein the mechanical separator is radially deformable between a first position in which the fluid sample can pass between an inner surface of the sidewall of the specimen collection container and the mechanical separator, and a second position in which at least a portion of the mechanical separator circumferentially contacts the inner surface of the sidewall preventing the fluid sample from passing between the inner surface of the sidewall of the collection container and the mechanical separator.

3. The apparatus of claim 1, wherein the mechanical separator comprises:
   a deformable bellows having an upper end and a lower end, and a sealing portion disposed therebetween providing sealing engagement with the sidewall of the specimen collection container;
   a float, having a first density, engaged with a portion of the bellows; and
   a ballast, having a second density, the second density being greater than the first density, engaged with a portion of the bellows.

4. The apparatus of claim 1, wherein the mechanical separator comprises a separator body having a through-hole defined therein, the through-hole adapted for allowing fluid to pass therethrough, the separator body comprising a float, having a first density, and a ballast, having a second density greater than the first density, wherein a portion of the float is connected to a portion of the ballast.

5. The apparatus of claim 4, wherein the mechanical separator is releasably engaged with a portion of the closure.

6. The apparatus of claim 4, wherein the mechanical separator is engaged with a portion of the closure in a first initial position, and wherein the mechanical separator is engaged with a portion of the sidewall of the specimen collection container in a second sealing position.

7. The apparatus of claim 1, wherein the fluid specimen is blood, and the first phase comprises lower density blood constituents, and the second phase comprises microorganisms.

8. The apparatus of claim 1, wherein the sensor comprises one or more electronic, electrochemical, thermal, impedance, capacitance, redox, and/or turbidity mechanisms for detecting at least one of metabolic energy, carbon dioxide, pH, and volatile organic compounds.

9. The apparatus of claim 1, wherein the sensor device is a solid-state optical sensor.

10. The apparatus of claim 1, wherein the second phase is denser than the first phase and the sensor is provided in communication with the second phase.

11. The apparatus of claim 1, further comprising a lysis reagent disposed within the interior of the specimen collection container.

12. The apparatus of claim 1, wherein a volume of fluid of the second phase is from about 1 µl to about 500 µl.

13. The apparatus of claim 1, wherein a volume of fluid of the second phase is from about 5 µl to about 200 µl.

14. The apparatus of claim 1, wherein the bottom end is open and a second closure is engageable with the open bottom end to seal the open bottom end.

15. The apparatus of claim 1, wherein the apparatus further comprises microorganism growth media co-formed with the electronic sensor.

16. An apparatus for detecting the presence of a microorganism, comprising:
- a specimen collection container comprising an open top end, a bottom end, and a sidewall extending therebetween defining an interior therein;
- a closure engageable with the specimen collection container to seal the open top end;
- a mechanical separator disposed within the interior and adapted for separating a fluid specimen into first and second phases within the specimen collection container, the mechanical separator comprising a one-way valve and isolating a first chamber portion of the interior from a second chamber portion of the interior, wherein the one-way valve is transitionable from a closed position, in which the first chamber portion is in fluid isolation from the second chamber portion, to an open position, in which a portion of the fluid specimen may pass through the one-way valve from the first chamber portion to the second chamber portion; and
- an electronic sensor disposed within the interior of the specimen collection container, comprising one or more electronic, electrochemical, thermal, impedance, capacitance, redox, and/or turbidity mechanisms, and capable of detecting the presence of a microorganism within the interior of the specimen collection container.

17. The apparatus of claim 16, wherein the one-way valve is transitionable from the closed position to the open position upon application of an applied rotational force.

18. The apparatus of claim 17, wherein the one-way valve is subsequently transitionable from the open position to the closed position upon cessation of the applied rotational force.

19. The apparatus of claim 16, wherein the sensor is provided in communication with the second chamber portion.

20. The apparatus of claim 16, wherein a volume of fluid of the second chamber portion is from about 1 µl to about 500 µl.

21. The apparatus of claim 16, wherein a volume of fluid of the second chamber portion is from about 5 µl to about 200 µl.

22. The apparatus of claim 16, wherein the electronic sensor is a sensor for detecting at least one of metabolic energy, carbon dioxide, pH, and volatile organic compounds.

23. The apparatus of claim 16, further comprising a lysis reagent disposed within the interior of the specimen collection container.

24. An apparatus for detecting the presence of a microorganism, comprising:
- a specimen collection container comprising an open top end, a bottom end, and a sidewall extending therebetween defining an interior therein, the interior comprising a lysis reagent disposed therein;
- a closure engageable with the specimen collection container to seal the open top end;
- a mechanical separator disposed within the interior and adapted for separating a fluid sample into first and second phases within the specimen collection container, the mechanical separator having at least one feature selected from the group consisting of at least two regions of differing densities, a density gradient, and a one-way valve and isolating a first chamber portion of the interior from a second chamber portion of the interior, wherein the one-way valve is transitionable from a closed position, in which the first chamber portion is in fluid isolation from the second chamber portion, to an open position, in which a portion of the fluid specimen may pass through the one-way valve from the first chamber portion to the second chamber portion; and
- a solid-state sensor disposed within the interior of the specimen collection container and capable of detecting the presence of a microorganism within the interior of the specimen collection container, the solid-state sensor capable of detecting at least one of metabolic energy, carbon dioxide, and pH.

* * * * *